United States Patent [19]

Downer et al.

[11] 4,125,395

[45] Nov. 14, 1978

[54] NON-PHYTOTOXIC MICRONUTRIENT COMPOSITIONS

[75] Inventors: John D. Downer; Dulcie Ragoonanan, both of Pointe-a-Pierre, Trinidad and Tobago

[73] Assignee: Texaco Trinidad, Inc., Pointe-a-Pierre, Trinidad and Tobago

[21] Appl. No.: 776,690

[22] Filed: Mar. 11, 1977

Related U.S. Application Data

[63] Continuation-in-part of Ser. No. 360,505, May 15, 1973, abandoned, and Ser. No. 531,951, Dec. 12, 1974, abandoned.

[51] Int. Cl.² ............................................ C05F 11/00
[52] U.S. Cl. ...................................... 71/27; 260/429.9; 424/356; 252/38; 260/438.1; 260/439 R; 260/429 R
[58] Field of Search ................................ 71/1, 11, 27; 260/514 N; 424/356, 287, 288; 252/38

[56] References Cited

U.S. PATENT DOCUMENTS

| | | | |
|---|---|---|---|
| 2,865,956 | 12/1958 | Ellis et al. | 260/514 N X |
| 3,661,550 | 5/1972 | Downer et al. | 71/27 |

Primary Examiner—Ferris H. Lander
Attorney, Agent, or Firm—Thomas H. Whaley; Carl G. Ries; Henry W. Archer

[57] ABSTRACT

A micronutrient composition intended for application to the foliage or branches of plants is described as containing oil-soluble overbased copper, molybdenum, zinc, manganese or iron naphthenates in a horticultural non-phytotoxic spray oil. The composition is made metathetically by mixing a solution of naphthenic acids, having an acid value ranging from about 90 to 280 mg.KOH/g., in a light aromatic solvent, with a methanolic sodium hydroxide solution and a methanolic solution of the desired metal salt of an inorganic acid; distilling off the methanol, the water and some of the aromatic solvent, adding the spray oil and removing the rest of the aromatic solvent. The ratio of equivalents of metal to naphthenate in these salts ranges from 1.1 to 20.

The naphthenates are in the form of micelles with each micelle having an empirical formula represented by $MR_2 \cdot xM(OH)_2 \cdot yMO$, wherein R is the naphthenate radical, M is the divalent micronutrient metal and $(x + y)$ is the overbasicity ranging from 0.1 to 19. It is believed the micelles consist of a core containing the excess basicity enclosed in an outer layer of neutral metal naphthenates.

10 Claims, 3 Drawing Figures

KEY:
A = 200/600
B = 400/600
C = 200/800
D = 400/800

NON-PHYTOTOXIC MICRONUTRIENT COMPOSITIONS

CROSS REFERENCE TO RELATED APPLICATIONS

This application is a continuation-in-part of coassigned patent applications Ser. No. 360,505, filed May 15, 1973, and Ser. No. 531,951, filed Dec. 12, 1974, both now abandoned.

BACKGROUND OF THE INVENTION

1. Field of the Invention

This invention relates to oil-soluble overbased trace metal naphthenates and to their use as micronutrients. In one of its aspects, the invention relates to the preparation of overbased metal naphthenate spray oil solutions which possess increased proportions of the metal while remaining non-phytotoxic. In another, the invention is concerned with the use of such compositions for foliar feeding.

Certain elements are required by plants in very small quantities for their proper nutrition. These so-called trace elements (also referred to as minor- or micro-elements) include copper, iron, manganese, molybdenum and zinc. Trace elements deficiencies in plants are widespread and often occur in soils which contain adequate quantities of the element but in a form unavailable to the plant. The shortage of one or more of these elements usually affects the plant appearance and its productivity, giving rise to typical growth symptoms. Trace element deficiencies are widespread in citrus-growing areas. In Trinidad, zinc and manganese are probably the most encountered nutrient disorders in citrus, and in Jamaica copper, iron, zinc and manganese deficiencies are quite common, while zinc and manganese deficiencies are the chief limiting factor in British Honduras.

A non-phytotoxic spray oil is believed more effective than the conventional aqueous medium for foliar micronutrient sprays; absorption through the leaf cuticle via the wax canals is more rapid and the oil solution is more resistant to weathering. Furthermore, the metal is presented in a non-ionic form.

2. Description of the Prior Art

The prior art to which this invention relates is aware, inter alia of U.S. Pat. Nos. 3,661,550 and 2,865,956. Reference is made to coassigned U.S. Pat. No. 3,661,550 which discloses oil-soluble but neutral metal naphthenate micronutrient compositions. While these are generally effective, they tend to cause burns on the surface of leaves, probably due to the presence of free naphthenic acids.

U.S. Pat. No. 2,869,956 describes naphthenates made by a carbonation method so that their overbasicity is due to the metal carbonate moiety of the naphthenate in the inner core of the micelle. The empirical formula which expresses this type of overbased metal naphthenate is $MR_2 \cdot xMCO_3$. The direct carbonation method for making 800% overbased metal naphthenate can be represented by the overall equation:

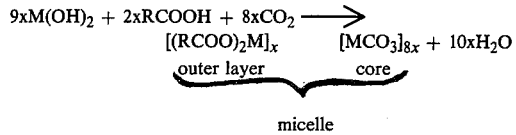

micelle where RCOOH represents naphthenic acid, M is the metal and $x$ is the number of metal naphthenate molecules in the outer layer of the micelle. We have not been able to make overbased naphthenates of the trace elements copper, iron, manganese, molybdenum and zinc by direct carbonation as described in U.S. Pat. No. 2,865,956.

SUMMARY OF THE INVENTION

It has been discovered that the phytotoxicity exhibited by neutral metal naphthenates made from relatively low molecular weight naphthenic acids, and which is due at least in part to the presence of free naphthenic acids, can be eliminated by using metathetically produced overbased trace metal naphthenates, perhaps because of the built-in buffer effect of the excess base. Overbasing also permits a much higher concentration of metal to be carried as a clear dispersion in the spray oil, facilitating handling and low volume spraying.

As used herein, an overbased metal naphthenate is an associate or micelle of the metal naphthenate with basicity as hydroxide/oxide in excess of that theoretically possible in the neutral naphthenate. It may be represented by the empirical formula $MR_2 \cdot xM(OH)_2 \cdot yMO$, wherein R is naphthenate radical, M is divalent micronutrient metal, and $(x + y)$ is the overbasicity ranging from 0.1 to 19. Overbasicity is conveniently expressed at 100 times the number of equivalents of excess base divided by the number of equivalents of naphthenate present in the overbased naphthenate.

The overbased metal naphthenates of this invention are prepared by the following reaction:

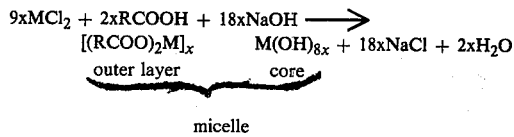

micelle wherein M is zinc, copper, iron, manganese or molybdenum, R is a cycloalkyl radical having from 10 to 43 carbon atoms, and $x$ is the number of metal naphthenate molecules in the outer layer of the micelle. Under proper reaction conditions herein described the overbasicity achieved depends on the ratio of base to naphthenic acids employed. As hereafter described the metal inorganic salt reactant is not restricted to metal chlorides but can be any inorganic salt. Furthermore, although the excess base in the core of the micelle is represented above as being hydroxide it is apparent that metal oxide is also present in varying amounts as discussed below.

The formation of overbased salts appears to involve essentially the protection of colloidal metal hydroxide/oxide particles by an absorbed layer of the neutral metal salt of the naphthenic acid, possibly in association with absorbed hydroxyl ions and/or methanol. Thus, overbased salts arise when metal hydroxide/oxide is presented to the neutral salt of the organic acid under conditions in which the neutral salt is able to coat the metal hydroxide/oxide with an absorbed layer before crystallization/gellation of the particles has time to occur.

The overbased metal naphthenates all exhibit infra red spectra typical for the hydroxyl group and liberate water on thermal treatment, indicating the presence of metal hydroxide. However, the ratio of hydroxide to oxide varies according to the metal. Thus the excess metal in the case of the overbased cupric and manganous naphthenates is present mainly as hydroxide, as determined by infra red spectra, thermal decomposition and other means. There is some inconsistency in the published literature concerning the temperatures at which the various micronutrient metal hydroxides decompose to their respective oxides. Generally agreed figures reported in the literature for cupric and manganous hydroxides are around 160° and 165° C. respectively; that for zinc hydroxide is much lower. Apparently the micelle structure, by which the excess metal hydroxide/oxide in the core is protected by an outer layer of metal naphthenates, tends to give added thermal stability to the metal hydroxide, and more severe thermal treatment is required to decompose the hydroxides. Thus refluxing the cupric or manganous naphthenates spray oil concentrates in pseudocumene (b.p. 169° C.) only decomposes the hydroxides very slowly. A higher boiling solvent, 1-methylnaphthalene (b.p. 245° C.), was used for the complete decomposition of the hydroxides present. Vacuum dried (120° C.) samples of overbased cupric, manganous and zinc naphthenates spray oil concentrates were refluxed in 1-methylnaphthalene. The water from the decomposition of any hydroxides in the micelles was collected by a Dean and Stark trap. The amounts are given below as a percentage of the theoretical amount possible if the excess metal in the overbased naphthenates were present entirely as hydroxide.

|  | Water, % theoretical |
|---|---|
| 800% Overbased cupric naphthenate | 95.3 |
| 800% Overbased manganous naphthenate | 92.5 |
| 800% Overbased zinc naphthenate | 8.3 |

In contrast to the copper and manganese compositions the overbased zinc naphthenates contains the excess zinc mainly as oxide.

In accordance with this invention, highly overbased oil-soluble trace metal naphthenates sprays are prepared, as more fully hereinafter described, by forming metal naphthenates and dissolving them in horticultural spray oil, the ratio of equivalents of metal to naphthenate being from over 1 to 20. Such oils are applied at the rate of from 0.5 to 10 gallons per acre at a concentration of 0.025 to 8.0% of metal and higher to the foliage or branches of plants and are effective in supplying micronutrients to the plant without being phytotoxic.

It is theoretically possible to make overbased naphthenates of the micronutrient metals with basicity as carbonate by the metathetical procedure using alkali carbonate in place of alkali hydroxide. It would also seem possible to make these overbased naphthenates by the carbonation method as described in U.S. Pat. No. 2,865,956. However, we have not been successful in making overbased naphthenates of the micronutrient metals, zinc, copper, manganese, iron, and molybdenum, with overbasicity as carbonate, by either the metathetical procedure or by the said carbonation method. We believe the metathetical method for making overbased naphthenates of the micronutrient metals using alkali hydroxide, as described herein, to be the only general and facile route.

DESCRIPTION OF THE INVENTION

In the metathetical method of forming the overbased trace metal naphthenates, alcoholic solutions of a trace metal inorganic salt and alkali hydroxide are added to a stirred solution of naphthenic acids in light hydrocarbon diluent of higher boiling point than the alcohol used for dissolving the inorganic salt and alkali hydroxide. The alcohol and any water are then removed by distillation, by-product alkali salt separated from the residue by filtration, carrier oil added to the filtrate and the light hydrocarbon solvent removed by distillation.

Figure 1:
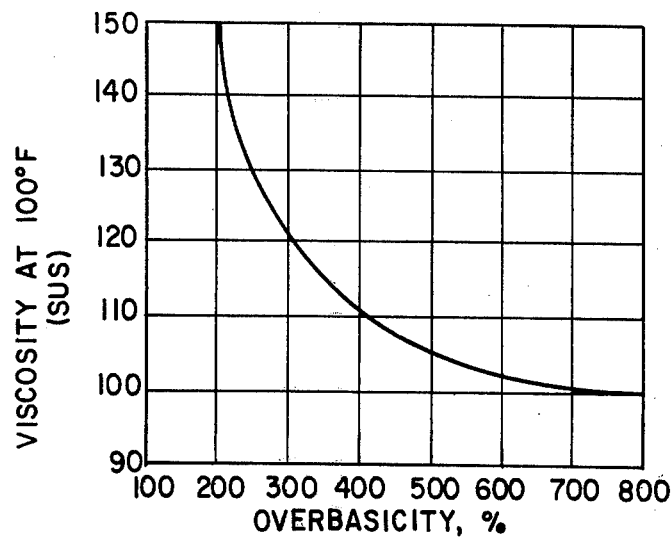
FIG. 1 is a plot of viscosity-overbasicity curves for overbased zinc naphthenates in carrier oil (3% Zinc)

The viscosity of a spray oil is an important property in application, and especially with low volume spraying. A knowledge of the relationship between viscosity and overbasicity is therefore desirable as is also the effect which mixing naphthenates of different overbasicities can have on both viscosity and product stability. In the metathetical route, the desired overbasicity is controlled by adjusting the relative equivalent proportions of naphthenic acids to metal inorganic salt and alkali hydroxide used in the reaction. In terms of the elemental metal, the material cost of the overbased salts decreases exponentially with increase in overbasicity but little advantage is gained by exceeding an overbasicity of approximately 800 percent. Example I gives the general procedure for making overbased zinc naphthenates spray oil concentrates. Zinc naphthenates with overbasities in the range 200–800% in carrier oil (Example II and Table II) have been prepared by this general procedure using naphthenic acids, A.V. 110 mg. KOH/g., and adjusting the relative equivalent proportions of the reactants. The viscosity-overbasicity relationship at 3% zinc concentration is shown in FIG. 1. The concentration curves developed for the different overbased zinc naphthenates in spray oil are given in FIG. 2, and for blends of equal parts of any two of the compositions in FIG. 3. It will be seen that overbased zinc naphthenates of different overbasicities when blended in equal volumes equilibrate to a salt with an overbasicity corresponding to the mean of the salts blended. Similar relationships between overbasicity, viscosity and concentration hold for the overbased naphthenates of other micronutrients.

The spray oil solutions of the overbased trace metal naphthenates do not have any pH. Moreover the saturated aqueous extracts of the spray oil concentrates are virtually neutral so that it is not surprising that the overbased micronutrient metal naphthenates are relatively nonphytotoxic as exemplified later. Overbased ferrous naphthenates spray oil concentrate is of special significance in this respect.

Unlike many micronutrients, iron is usually present in the soil in abundance but frequently in an unavailable form. For example, iron chlorosis, the deficiency symptom in plants, is widespread on calcarious soils where the element is in precipitation. Iron deficiency chlorosis can also be induced by potassium deficiency and overmanuring with phosphates on neutral and calcarious soils. This plant condition may also occur on soils high in available zinc, manganese and copper. Thus there is a definite need for an iron micronutrient composition for efficient foliar application. Example III describes the preparation of such a composition. The preparation of overbased ferrous naphthenates in spray oil follows closely the general procedure used for making the overbased zinc and copper naphthenates, the only modification being to increase the solvent quantities in order to improve the filtration of the by-product sodium chloride. This overbased ferrous naphthenate spray oil is the least potentially phytotoxic of all the overbased trace metal naphthenates disclosed in this invention. The iron spray oil is non-phytotoxic to corn seedlings even at 1.0% w/v iron content (Table III). Indeed, improved seedling growth was observed to increase with iron concentration.

The trace metal inorganic salts used in the preparation of the overbased salts by the metathetical method are common salts such as chlorides, sulphates, nitrates, etc., soluble in the lower alkanols such as methanol.

Sodium hydroxide is the preferred alkali hydroxide but other alkali hydroxides such as potassium hydroxide may be used.

The naphthenic acids employed in the preparation of the overbased salts of the present invention are aliphatic cyclic hydrocarbon carboxylic acids that are usually obtained by treating a naphthenic crude oil or fractions thereof with a caustic solution to form naphthenates that are soluble in aqueous solution. Such acids are described in greater detail in Kirk-Othmer, "Encyclopedia of Chemical Technology", Interscience Encyclopedia Co., 1952, Vol. 9, starting on page 241. For the purpose of the present invention, acids having a molecular weight in the range of 200 to 620 are effective. These acid can also be characterized by their acid value expressed in terms of milligrams equivalent of potassium hydroxide per gram of acids. Example IV (Table IV) describes the preparation of overbased zinc naphthenates spray oil concentrates from naphthenic acids with different acid values.

The light hydrocarbon diluent used with the naphthenic acids in preparing the overbased trace metal naphthenates spray oil concentrates is preferably a hydrocarbon, such as benzene, toluene and xylene which is a liquid with a low viscosity at room temperature, including other aromatic solvents boiling up to about 300° F. provided their viscosity is not too high. The quantity of solvent to be used will be determined partly by the solubility of the particular naphthenic acids used. Normally xylene is used since it also facilitates removal of the by-product water with which it forms an azeotrope at 92° C. There is usually a minimum quantity of xylene required, indicated in the examples, below which inferior product and yield is experienced.

The preferred alcohol for use with the alkali hydroxide and metal salt in the preparation of the overbased metal naphthenates spray oil concentrates is methanol because it is relatively inexpensive and volatile, and therefore readily removed and recovered during work up. The volume of methanol recommended for a reaction time of one hour is given in the examples. Less methanol can be used but generally product quality and yield are reduced and reaction time is affected. Water can be tolerated in the reaction mixture. Indeed in the preparation of the manganese formulations water is essential. Thus in contrast to the preparation of the zinc, iron and copper overbased naphthenates difficulties will be experienced with reproducibility and gelling when making the overbased manganous naphthenates if anhydrous conditions are used. This is believed to be due to the tendency for sodium hydroxide to form basic salts with anhydrous manganous salts. No problems of reproducibility or gelling were experienced when a little water was present during the reaction or when hydrated manganous salts were used. Example V describes the established procedure for making the overbased manganous naphthenate using hydrated manganous chloride.

The amount of water which can be added varies according to the overbased metal naphthenate being prepared. In the case of preparing the copper compositions at least 30 percent of the total weight of the reaction mixture can be added. Far less water is tolerated with the zinc preparations. The addition of water enables water-soluble metal salts which are insoluble or only sparingly soluble in methanol to be used in the reaction. Examples VI and VII and Table V describe some preparations using aqueous solutions of the metal salt reactant. When water is added to the reaction some adjustment to the quantity of solvents may be necessary. In general considerably less methanol and xylene can be used when no water is present. Some of the higher aliphatic alcohols may be used in place of methanol depending on the solubility of the metal salt being used. Example VII gives a preparation using ethanol in place of methanol.

The horticultural spray oil used here is hydrocarbon mineral oil having a gravity API of 31–36, a viscosity at 100° F. of 81 to 87 Saybolt Universal Seconds and a boiling range between 600° and 775° F. An analysis of four preferred oil samples is given in Table I. However, for normal applications highly refined carrier oils, predominantly paraffinic, having a minimum API gravity of 27, viscosity at 100° F. of between 55 and 100 Saybolt Universal Seconds, boiling range of 600°–775° F. and minimum unsulphonated residue of 85%, would be suitable. A lighter oil with API gravity around 50 and boiling point range 85°–600° F. belonging to the general groups of paraffins, isoparaffins and/or naphthenes is desirable for use with light-weight ultra low volume sprayers.

Within the range of ambient temperature and 40° C. the reaction temperature used in making the overbased trace metal naphthenates spray oil concentrates is not critical. At temperatures above 40° C. product quality and/or yield are inferior. Typical data are given below:

| Reaction Temp. | Overbased Metal Naphthenate | | | | | | | |
|---|---|---|---|---|---|---|---|---|
| | Overbasicity, % | | | | Yield, % (basis metal) | | | |
| ° C | Zn | Mn | Cu | Fe | Zn | Mn | Cu | Fe |
| Ambient (28) | 829 | 795 | 815 | 868 | 100 | 95 | 98.5 | 91$_b$ |
| 45 | 744 | 868 | 800$^a$ | 863$^b$ | 81 | 100$^c$ | 100$^{ac}$ | 81$^b$ |
| 60 | 557 | decomp. | 832 | — | 69 | decomp. | 99$^c$ | — | a 40° C
b 50° C
c viscous product

It is recommended the reaction be carried out at between 20° and 30° C.

The methanolic inorganic salts and methanolic alkali hydroxide solutions are preferably added separately but simultaneously over 1 hour. The time is not critical but to obtain good quality product in high yield good mixing is essential. For the laboratory preparations, using a stirrer at 775 rpm, an addition time of 1 hour followed by further stirring for 40 min. was found to be adequate. In larger scale preparations, as described in Example VIII, using a 110 gallon Pfaudler reactor with anchor type stirrer (110 rpm), we found it necessary to increase the stirring period, after the addition of the reactants, to 90 minutes, to obtain a good product in optimum yield. The mode of addition is not critical. Consecutive addition, i.e. adding the inorganic reactants in turn to the naphthenic acids, generally results in a lower product yield, separation difficulties during subsequent work-up, and a more variable product overbasicity. Reverse addition, i.e. adding the naphthenic acids in a light hydrocarbon diluent to the stirred methanolic solution of the inorganic reactants, gives a good yield of product with high overbasicity. However, the best control of product quality with high product yield is obtained by the simultaneous addition of the inorganic reactants to the naphthenic acids, and this is the preferred procedure. Typical data are given below:

| | Mode of Addition | | | | | | | |
|---|---|---|---|---|---|---|---|---|
| | Simultaneous | | Consective | | | | Reverse | |
| | | | (1) | | (2) | | | |
| | Mn | Zn | Mn | Zn | Mn | Zn | Mn | Zn |
| Overbasicity, % | 795 | 829 | 768 | 600 | 769 | 1000 | 810 | 940 |
| Yield (basis metal) % | 95 | 100 | 81 | 54 | 84 | 100 | 91 | 91 |

(1) sodium hydroxide added first then metal chloride
(2) metal chloride added first then sodium hydroxide Water and sodium chloride (or other alkali salt) are both formed in the reaction. Because the reaction mixture consists mainly of methanol and xylene, the sodium chloride is largely precipitated. However, the presence of water causes some of the chloride to remain in solution. Consequently it is necessary to distil the water completely in order to ensure that all the sodium chloride (or other salt) is removed during the filtration or centrifuging stage. The water distils with some of the xylene as an azeotrope (b.p. 92° C., 35.8% water). To complete the removal of the azeotrope it is best to distil until the pot temperature reaches 140° C. To avoid encrustation of the salt in the pot it is advisable to agitate during this distillation. Failure to remove all the sodium chloride during the filtration centrifuging stage, leads to precipitation, subsequently, in the still pot of the vacuum distillation unit used for the removal of the xylene.

In removing the xylene from the crude reaction product it is preferable that a liquid temperature of not greater than 130° C. is used. At higher liquid temperatures some product decomposition may occur, depending on the specific overbased metal naphthenates spray oil concentrate, resulting in lower yields.

The laboratory process for making the overbased trace metal naphthenates spray oil concentrates can be readily scaled-up, the only modification being to increase the reaction time as mentioned above. Thus Example VIII describes the preparation of some 56 kg. of 837% overbased zinc naphthenates concentrate in spray oil: the mass balance data in this preparation are excellent and conversions of zinc chloride and naphthenic acids are virtually quantitative.

The viscosity and stability of the naphthenates and blended naphthenates remain unchanged on standing at elevated temperatures up to 120° C. over long periods. In general product stability is good. All the overbased metal naphthenates concentrates are thermally stable at 100° C. Even at 200° C. sedimentation is slow with the zinc composition. The copper spray oil concentrate begins to decompose slowly above 130° C. Long term stability tests carried out on the overbased metal naphthenates concentrates confirmed that the products after the xylene stripping stage are stable when stored in sealed containers. Nevertheless a final centrifuging of the concentrate in spray oil, after removing the xylene, is desirable in order to remove traces of any suspended fine solids. In tests carried out with the zinc and manganese compositions the final products, which had been centrifuged to remove traces of any suspended fine solids, were completely clear with no trace of sedimentation after six months in sealed containers stored exposed to the light.

All the overbased naphthenates hereinbefore and hereinafter described possess excellent non-phytotoxicity as determined with corn seedlings, banana leaves, citrus and tomato plants. The beneficial effects of overbased ferrous naphthenates concentrate in spray oil have been mentioned already (Example III, Table III). Example IX describes further preparations of overbased trace metal naphthenates spray oil concentrates, results of their testing for non-phytotoxicity and evaluation as micronutrients for foliar application.

Where desired the spray oil solution can be emulsified with water for moderate volume applications (2–20 gal/acre).

It will be noted by those skilled in this art that at least some of the oils encompassed by the above definitions have pesticidal, acaricidal, insecticidal, viricidal and/or fungicidal activities, and that such properties are retained in the claimed compositions which contain such materials. Accordingly, these compositions have multiple effects. It will also be appreciated that manganese, copper and zinc have fungicidal properties.

TABLE I

| ANALYSES OF CARRIER OILS USED | | | | |
|---|---|---|---|---|
| | Carrier Oil Samples | | | |
| | RS-1200/67 | RS-932/67 | RS-175/60 | RS-370/71 |
| Specific Gravity at 60/60° F (ASTM D-1298) | 0.8493 | 0.8487 | 0.8523 | 0.8492 |
| Gravity, ° API (ASTM D-1250) | 35.1 | 35.2 | 34.5 | 35.1 |
| Flash Point (COC), ° F (ASTM D-92) | 395 | 395 | 405 | 395 |
| Viscosity at 100° F, SUS (ASTM D-445/2161) | 84.2 | 83.3 | 86.5 | 81.6 |
| Colour (ASTM D-1500) | <0.5 | 0.5 | <0.5 | <0.5 |
| Pour Point, ° F (ASTM D-97) | 5 | 5 | 20 | 5 |
| Ash, wt. % | Trace | Trace | 0.003 | 0.005 |
| Corrosion Copper Strip, 3 hrs. at 212° F (ASTM D-130) | Pass | Pass | 1A | 1A |
| Neutralization Number, mg. KOH/g | 0.04 | 0.09 | 0.054 | 0.044 |
| Unsulphonated Residue, vol. % (ASTM D-483) | 94.2 | 94 | 92.8 | 91.4 |
| Distillation, ° F | | | | |
| IBP | 637 | 649 | 646 | 610 |
| 10% Recovery | 675 | 685 | 674 | 671 |
| 90% Recovery | 729 | 730 | 729 | 732 |
| FBP | 745 | — | 750 | 756 |

DESCRIPTION OF SPECIFIC EMBODIMENTS

The following data and examples illustrate the preparation of the novel overbased trace metal naphthenates of the present invention and their specific utility with respect to their use as foliar feeding agents in certain horticultural spray oils. It will be understood, however, that it is not intended to limit the invention to the overbased metal naphthenates described. Neither is it intended to restrict the preparation to single overbased metal naphthenates. Mixed overbased metal naphthenates may be prepared by combining the spray oils containing single prepared overbased metal naphthenates, or by using a desired mixture of metal inorganic salts in the metathetical reaction.

EXAMPLE I

General Procedure for making nominal 800% overbased trace metal naphthenates spray oil concentrate Solutions of sodium hydroxide (57.6 g., 1440 m.eq.) in methanol (640 g.) and the trace metal inorganic salt (1440 m.eq.) in methanol (640 g.) are added simultaneously over 1 hour to a solution of the naphthenic acids (160 m.eq.) in xylene (1100 g.), contained in a three-necked flask at room temperature with controlled stirring (775 rpm). When the addition is completed stirring is continued for an additional 40 minutes. The methanol, water and some of the xylene are removed by distillation at a vapour temperature of 140° C. The residual xylene solution is passed through a filter precoated with Celite to clarify it and to remove by-product sodium salt. Spray oil (200 to 300 g.), as specified in Table I, is added to the filtrate and the xylene removed under vacuum to a liquid temperature of 130° C. leaving the residue as the required product. The total naphthenates content of the product is determined by diluting an aliquot (10 ml.) in xylene (40 ml.) and shaking vigorously with 5N hydrochloric acid (20 ml.) and isopropanol (10 ml.), and the phases separated. The organic phase is washed further with water/isopropanol (10/10 ml.) and analyzed for naphthenic content titrimetrically. The combined aqueous phase and water washings is analyzed for metal content by atomic absorption spectroscopy. The criterion used for determining the stabilities of the products obtained is to measure the amount of sediments obtained upon centrifuging, 2000 g. for 10 minutes, the sample (15 ml.) which had been kept on a steam bath for 4 weeks.

EXAMPLE II

Varying the overbasicity

Figure 2:
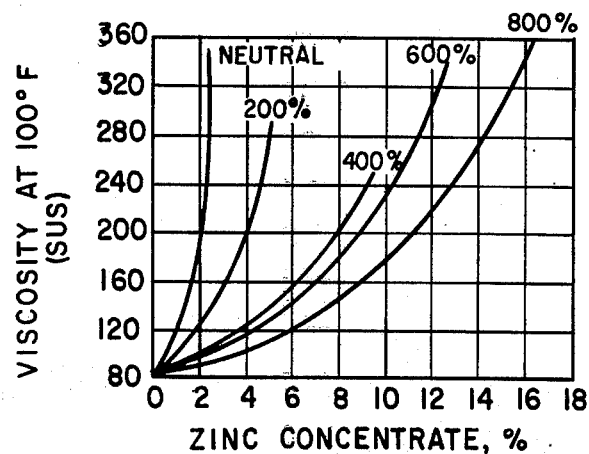
FIG. 2 is a plot of viscosity-concentration for overbased zinc naphthenates in carrier oil for different overbasicities.
Figure 3:
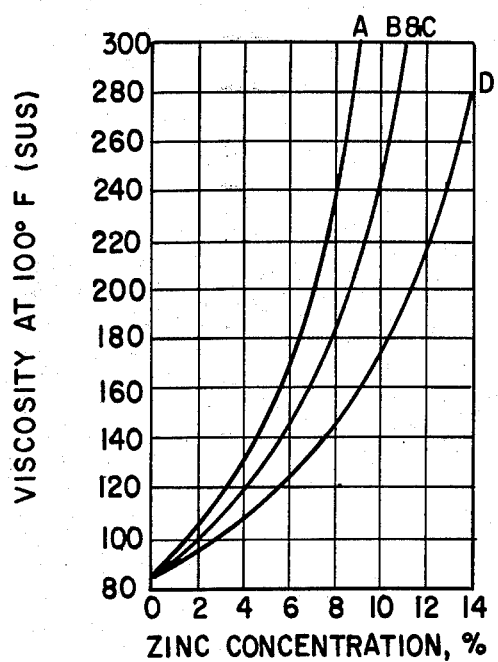
FIG. 3 is the same as FIG. 2 for blends of equal parts of any two of the compositions.

Four preparations were carried out according to the general procedure (Example I) using 160 m.eq. naphthenic acids of acid value 110 mg. KOH/g. and zinc chloride/sodium hydroxide. Details of the quantities used and analyses of the concentrates obtained are given in Table II. Samples of each product were diluted with spray oil (Table I) so as to obtain different concentrations of zinc and their viscosities determined at 110° F. using Cannon Fenske viscometers (FIGS. 1–3).

TABLE II

ZINC NAPHTHENATES SPRAY OIL CONCENTRATES WITH DIFFERENT OVERBASICITIES

| | | | | |
|---|---|---|---|---|
| Sodium Hydroxide, m.eq. | 480 | 800 | 1120 | 1440 |
| Zinc Chloride, m.eq. | 480 | 800 | 1120 | 1440 |
| Product | | | | |
| Weight, g. | 315 | 298 | 298 | 305 |
| Density, g./ml. | 0.9245 | 0.9632 | 1.0205 | 1.050 |
| Zinc content, | | | | |
| g./100 ml. | 4.9 | 9.0 | 12.2 | 16.2 |
| m.eq./100 ml. | 150 | 280 | 373 | 495 |
| Naphthenate content, | | | | |
| m.eq./100 ml. | 50 | 52 | 57 | 57 |
| Overbasicity, % | 200 | 438 | 554 | 768 |
| Viscosity, SUS at 100° F | 271 | 240 | 331 | 353 |

TABLE II-continued

ZINC NAPHTHENATES SPRAY OIL CONCENTRATES WITH DIFFERENT OVERBASICITIES

| | | | | |
|---|---|---|---|---|
| Yield basis zinc, % wt. | 100 | 100 | 97 | 100 |

EXAMPLE III

Preparation of overbased ferrous naphthenates spray oil concentrate

Solutions of sodium hydroxide (14.4 g.) in methanol (320 g.) and ferrous chloride tetrahydrate (36 g.) in methanol (320 g.) were added simultaneously over one hour to a solution of Natex 100 (acid value, 110 mg.KOH/g.; 20.5 g.) in xylene (1100 g.) at room temperature with stirring. When the addition was completed, the mixture was stirred for a further 40 minutes. The methanol and water/xylene azeotrope were removed by distillation, not allowing the pot temperature to exceed 140° C. The residue was filtered through Celite to remove the sodium chloride by-product. Spray oil (200 ml.) was added to the filtrate and the remaining xlyene removed by distillation under vacuum at a maximum liquid temperature of 130° C. to give 190 grams of a clear dispersion of 900% overbased ferrous naphthenates in spray oil containing 4.34 g. iron/100 ml. and having a density of 0.905 g./ml.

Two greenhouse trials each of a simple randomised block design of six treatments, replicated five and six times in five and six blocks respectively, were carried out with corn seedlings using the aforementioned iron micronutrient. The treatments consisted of spraying the corn leaves with the overbased ferrous naphthenate spray oils at four metal concentrations and two controls of spray oil carrier alone and unsprayed, the oils being applied at the rate of 2 ml. per five and six pots (1–3 seedling/pot) using an artist air brush when the seedlings were about 7 days old. Fourteen days later the seedlings were measured and harvested for fresh and dry weight determinations. The aggregated data from the two trails were statistically analyzed and the results are given in Table III. The overall conclusion is that overbased ferrous naphthenate oil solutions of concentrations at least up to 1% w/v are not phytotoxic to seedling corn. In fact growth improved with increase in iron concentration.

EXAMPLE IV

Varying the molecular weight of the naphthenic acids

Four preparations were carried out according to the general procedure (Example I) using 160 m.eq. naphthenic acids of varying molecular weights. Details of the quantities used and analyses of the concentrates obtained are given in Table IV.

EXAMPLE V

Conditions for Preparing Overbased Manganous Naphthenates Concentrate in Spray Oil Hydrated manganous chloride (35.5 g., 360 m.eq.) dissolved in methanol/water (320 g./15 g.) and sodium hydroxide (14.4 g.) dissolved in methanol (320 g.) were added simultaneously over one hour to a well stirred solution of naphthenic acids (20.5 g., 40 m.eq.) of acid value 110 mg.KOH/g., in xylene (1100 g.) at ambient temperature. The reaction mixture was stirred for a further 45 minutes after addition was complete. The methanol and water/xylene azeotrope was then distilled from the reaction mixture at a pot temperature not greater than 140° C. The sodium chloride by-product in the residue was filtered through Celite and the filtrate blended with spray oil (200 ml.). The xylene was removed by vacuum distillation at a liquid temperature not greater than 130° C. to leave 200 g. of 919% overbased manganous naphthenates in spray oil containing 4.62 g. manganese/100 ml. and having a viscosity of 129.9 SUS at 100° F. and density of 0.903 g./ml.

EXAMPLE VII

Four preparations were carried out according to the general procedure (Example I) using 160 m.eq. naphthenic acids of acid value 110 mg.KOH/g. and zinc chloride/sodium hydroxide but using ethanol, methanol/water and water in place of methanol for carrying the inorganic reactants. Analyses of the products obtained are given in Table V.

TABLE III
OVERBASED FERROUS NAPHTHENATE (EX III) PHYTOTOXICITY TRIALS: MEAN TREATMENT EFFECT ON GROWTH OF CORN SEEDLING

| Treatment | Height (cm) | Weight in gms. (Fresh) | (Dry) | No. of Leaves | Leaf Area (cm$^2$) Non-functional | Functional | Total | Phytotoxicity Score[a] |
|---|---|---|---|---|---|---|---|---|
| Control | 19.2 | 33.5 | 3.90 | 16.5 | 10.9 | 1471.8 | 1482.8 | 0.6 |
| Spray Oil alone | 17.6 | 28.2 | 3.45 | 15.6 | 16.7 | 1271.4 | 1288.0 | 1.1 |
| 0.125% w/v Iron | 19.0 | 30.5 | 3.57 | 16.2 | 21.3 | 1334.1 | 1355.4 | 1.1 |
| 0.25% w/v Iron | 19.4 | 33.1 | 3.79 | 16.0 | 14.4 | 1394.1 | 1408.6 | 1.2 |
| 0.5% w/v Iron | 20.1 | 34.6 | 4.06 | 15.1 | 18.2 | 1459.1 | 1477.3 | 1.0 |
| 1.0% w/v Iron | 19.3 | 35.5 | 4.08 | 15.7 | 15.7 | 1521.0 | 1536.7 | 1.0 |
| Stand. Error = | 1.07 | 2.12 | 0.33 | 0.50 | 4.56 | 75.44 | 73.91 | 0.12 |
| Coeff. Var. % | 19.5 | 22.6 | 29.6 | 11.0 | 97.4 | 18.6 | 18.0 | 40.7 |

[a] 0 = None
1 = Slight
2 = Moderate
3 = Severe

TABLE IV
OVERBASED ZINC NAPHTHENATES FROM NAPTHENIC ACIDS OF VARYING MOLECULAR WEIGHTS

| Naphtenic Acid, mg.KOH/g. Acid Value | 84 | 110 | 129 | 236 |
|---|---|---|---|---|
| Product |  |  |  |  |
| Weight, g. | 312 | 305 | 392 | 334 |
| Density, g./ml. | 0.9862 | 1.050 | 0.9898 | 1.005 |
| Zinc content, g./100 ml. | 11.6 | 16.2 | 13.6 | 14.2 |
| m.eq./100 ml. | 458 | 495 | 398 | 434 |
| Naphthenate content m.eg./100 ml. | 40 | 57 | 41 | 40 |
| Overbasicity | 795 | 768 | 864 | 980 |
| Viscosity SUS at 100° F | 188 | 353 | 157 | 224 |
| Yield basis zinc, % wt. | 100 | 100 | 100 | 100 |
| Stability, % sediment (100° C) | <0.1 | <0.1 | <0.1 | <0.1 |

TABLE V
OVERBASED ZINC NAPHTHENATES: VARIATION OF THE HYDROXYLIC SOLVENT

| Solvent | MeOH | EtOH | MeOH/H$_2$O (50%) | H$_2$O |
|---|---|---|---|---|
| Product |  |  |  |  |
| Weight, g. | 305 | 358 | 433 | 335 |
| Density, g./ml. | 1.050 | 0.8996 | 0.9463 | 0.8842 |
| Zinc Content, g./100 ml. | 16.2 | 3.3 | 8.1 | 0.97 |
| m.eq./100 ml. | 495 | 101 | 247 | 30 |
| Naphthenate Content, m.eq./100 ml. | 57 | 33 | 36 | 32 |
| Overbasicity, % | 768 | 206 | 586 | 0 |
| Viscosity, SUS at 100° F | 353 | 160 | 203 | 192 |
| Yield basis zinc, % wt. | 100 | 68 | 78 | 8 |
| Stability, % sediment (100° C) | <0.1 | 0.2 | 0.3 | 0.18 |

EXAMPLE VI

Preparation of overbased ferrous naphthenates spray oil concentrate

Solutions of sodium hydroxide (28.8 g.) in methanol (320 g.) and cupric sulphate pentahydrate (89.6 g.) in water (250 g.) were added simultaneously to a stirred solution of naphthenic acids (18.9 g.), of acid value 236 mg.KOH/g., in xylene (550 g.) at ambient temperature over 1 hour. When addition was completed the mixture was stirred for a further 45 minutes. The methanol was then removed by distillation and the water removed by distilling the azeotrope formed with xylene. The residual xylene solution of the overbased salt produced containing suspended by-product sodium sulphate was filtered on a Celite/spray oil filter bed. Spray oil (Table I), 200 ml., was added to the filtrate and the xylene removed by vacuum distillation at a liquid temperature ≦120° C., to give 219 g. 802% overbased cupric naphthenates spray oil concentrate containing 9.4% w/v copper equivalent to a yield of 94.8%, with a viscosity SUS at 100° F. of 141.2.

EXAMPLE VIII

A number of large scale runs has been carried out. Typical procedure, product quality and yield for overbased zinc naphthenates spray oil concentrate were as follows:

Solutions of zinc chloride (12.30 kg.) in methanol (101 l.) and sodium hydroxide (7.20 kg.) in methanol (101 l.) were pumped simultaneously at ambient temperature (ca. 28° C.) over one hour into a glass-lined, steam jacketed vessel containing a 500 liters solution of naphthenic acids (acid value 110 mg.KOH/g., 10.20 kg.) in xylene (158 l.) stirred with an anchor type stirrer at 110 rpm. (The reaction is endothermic to a negligible extent). After adding the reagents, mixing was continued for 90 minutes. The methanol and xylene/water azeotrope were removed from the reactor through an overhead condenser by steam heating. Stirring was continued to prevent caking of the sodium chloride which is precipitated during this operation. The steam pressure was limited to 30 psig to prevent decomposition of the overbased salt. The sodium chloride was removed by passing the residual mixture through a basket centrifuge (45.7 cm diam.) lined with filter paper and rotating at 2000 rmp (equiv. centrifugal force of 1000 g.). The centrifugate was blended with the spray oil (Table I, 47.3 l.) and distilled in a glass-lined steam jacketed still under reduced pressure (29 inches Hg.) up to a steam pressure of 70 psig max. to remove the remaining xylene. The residual liquor was passed through a high speed tubular centrifuge to remove any finely suspended material which migh separate on prolonged storage. The product (55.93 kg.) was a clear dispersion of 837% overbased zinc naphthenates in spray oil containing 10.6 g. zinc/100 ml. and having a viscosity of 159 SUS at 100° F. and density of 0.971 g./100 ml.

EXAMPLE IX

Materials for agronomic tests

Several batches of both overbased zinc and overbased manganous spray oil concentrates were prepared according to the general procedure (Example I) using 160 m.eq. naphthenic acid of acid value 112 mg.KOH/g. Manganous chloride tetrahydrate was used for making the overbased manganous composition. Each batch was analyzed separately and those with a sufficiently high degree of overbasicity (500–1000%) were combined for phytotoxicity and other agronomic tests. A summary of the analyses of the salts prepared is given in Table VI.

When phytotoxicity tests are carried out with neutral and overbased metal naphthenates on grapefruit and Valencia orange trees, as illustrated in Tables VII and VIII, the superiority of the overbased metal naphthenates becomes evident; plant injury is found only in trees treated with neutral metal naphthenates made from low molecular weight naphthenic acids.

The beneficial effects of foliar micronutrient treatment with spray oil containing overbased metal naphthenates are demonstrated by a field trial on 8-year-old Valencia orange trees. The trial is of a randomized block with six treatments replicated eight times in eight blocks. Details of the trial and results are given in Tables IX–XII.

TABLE VI

Summary of Analyses of Concentrated Overbased Zinc and Manganese Naphthenate Oil Solutions Used in Field Trials

|  | Volume, ml. | Metal Content g. metal/100 g. | Ratio of Equivalents Metal : Naphthenate |
|---|---|---|---|
| Overbased Zinc Naphthenate in Carrier Oil | | | |
| (1) RS- 736/68 | 1650 | 6.0 | 12.6 |
| (2) RS- 508/70 | 2000 | 6.8 | 11.0 |
| (3) RS-1219/71 | 4500 | 7.3 | 12.2 |
| Overbased Manganese Naphthenate in Carrier Oil | | | |
| (1) RS- 737/68 | 1800 | 2.1 | 6.8 |
| (2) RS- 509/70 | 2000 | 14.4 | 11.2 |
| (3) RS-1220/71 | 2500 | 5.9 | 9.8 |

Note: The stock solutions further diluted with carrier oil were applied singly or in mixture at concentrations of 0.4 and 0.2% w/v metal respectively.

TABLE VII

Metal Naphthenates in Spray Oil (1% W/V Metal Content) : Leaf Burn Tests

Each sample was sprayed on three separate sprigs of approximately 20 leaves. Two to four squirts from an aerosol spray of one second duration were applied to each spray to give complete coverage.

| Naphthenate | Leaf burn[b] (Grapefruit) |
|---|---|
| Neutral Zinc (230)[a] | Severe |
| Neutral Zinc (112)[a] | None |
| Neutral Manganese (230)[a] | Very Severe |
| Neutral Manganese (112)[a] | None |
| Overbased Zinc (230)[a] | None |
| Overbased Zing (112)[a] | None |
| Overbased Manganese (230)[a] | None |
| Carrier Oil Alone, RS-1200/67 | None |

[a] Acid value of naphthenic acids used
[b] Observation made 2–3 weeks after spraying.

TABLE VIII

Micronutrient Spray Oils: Phytotoxicity of Spray Applications on Valencia Orange Trees (0.4% W/V Metal Content)

| | Level of spray (gal/acre) | Observations (1) % | (2) % | Leaf Drop (%) |
|---|---|---|---|---|
| Untreated | None | 100 | None | None |
| Spray Oil Alone | 35 | 100 | None | None |
| Neutral Zinc Naphthenate (230) | 12 | 83 | 5 | 12 |
| Neutral Zinc Naphthenate (112) | 15 | 100 | None | None |
| 1000% Overbased Zinc Naphthenate (112) | 32 | 100 | None | None |
| Neutral Manganese Naphthenate (230) | 10 | 69 | — | — |
| Neutral Manganese Naphthenate (112) | 11 | 100 | None | None |
| 690% Overbased Manganese Naphthenate (230) | 12 | 100 | None | None |
| 834% Overbased Manganese Naphthenate (112) | 10 | 100 | None | None |

(1) Represents normal leaves
(2) Represents localized burns
Observations made 2–3 weeks after spraying The data in Table IX illustrate the non-phytotoxic nature of the overbased metal naphthenates. The micronutrient oil sprays result in slight plant injury but this is attributed to the carrier oil. Such plant injury can be minimized by using a lighter oil, optimum application rates and better distribution of the oil. A suitable droplet size is about 80 microns but this size can be within the range of about 50 to about 100 microns. A desirable density is about 32 droplets per cm².

The mean treatment effect on the incident of mottle-leaf symptoms observed on trees after spraying with overbased metal naphthenates is given in Table X. At three months after the spray treatment is applied the mottle-leaf symptoms due to trace metal deficiency disappear from the foliage of trees that receive the zinc sprays either in the oil solutions or in the aqueous mixture. This demonstrates the leaf's ability to use the deficient element provided even in a complex form. On the other hand, the trees sprayed with the manganese oil solution and the unsprayed ones continued to exhibit mottle-leaf symptoms, indicating the need for zinc by the trees and their ability to assimilate the deficient elements provided as either the aqueous metal salt or the oil solution of the overbased metal naphthenate.

Table XI shows the significant increase in leaf zinc content after foliar feeding. In the trial, leaf samples were taken from each plot for chemical analysis just before spraying and at 3 months and 11 months respectively after applying the initial foliar treatments. In the leaf samples taken before the spray treatments were applied, the mean leaf zinc content of all experimental trees was low (24 ppm) with that of some of the plot trees being in the deficiency range, while the mean leaf manganese concentration was in the excessive range (359 ppm), possibly due to the strongly acid reaction of the soil. The manganese sprays, especially when applied singly, would be expected to be non-beneficial to the orange trees. In fact, the treatment effects on the leaf manganese concentration was not significant (Table XI). Conversely, the treatment effects on the leaf zinc contents were highly significant at both sampling times.

concentrations of plants sprayed with the zinc solutions had fallen markedly (from the values at 3 months) at 11 months after the first treatments were applied; those leaf samples were obtained about 6 weeks after the initial crop was harvested. Nevertheless, the level of zinc in the leaves of such plants were still well within the satisfactory range (Table XI), indicating slight residual effects of the foliar spray. In fact, trees sprayed with the overbased zinc naphthenate in carrier oil and the aqueous metal solution had signjficantly higher mean concentrations of zinc in their leaves than those of trees that had not received zinc sprays.

Significantly smaller amounts of the trace elements by factors of 2.5 and 5 for the single element overbased

TABLE IX

MEAN TREATMENT EFFECTS ON INCIDENCE OF LEAF-BURN, LEAF-DROP AND FRUIT-DROP OBSERVED 9 DAYS[a] AFTER TREATMENT APPLICATION[b] TO VALENCIA ORANGE TREES[c]

| Treatments | Leaf-Burn | | Leaf-Drop | | Fruit-Drop | |
|---|---|---|---|---|---|---|
| | Mean Score[e] | Fiducial Limit | Mean Score[e] | Fiducial Limit | Mean Score[e] | Fiducial Limit |
| Control | 0 | 0.08; 0 | 0.06 | 0.27; 0 | 0.08 | 0.37; 0 |
| Carrier Oil Alone (Table I, RS-175/69) | 0.40 | 0.77; 0.14 | 1.28 | 1.77; 0.81 | 0.33 | 0.78; 0.06 |
| Overbased Zinc Naphthenate, 0.4% w/v % Zn in Carrier Oil (Table YZ, RS-508/70) | 0.62 | 1.05; 0.29 | 1.83 | 2.29; 1.34 | 1.12 | 1.71; 0.59 |
| Overbased Manganese Naphthenate, 0.4% w/v % Mn in Carrier Oil (Table VI, RS-509/70) | 0.81 | 1.26; 0.43 | 1.89 | 2.31; 1.41 | 1.13 | 1.72; 0.60 |
| Overbased Zinc and Manganese Naphthenates, 0.2 W/v % Zn + 0.2 w/v % Mn in Carrier Oil | 0.46 | .85; 0.17 | 1.76 | 2.22; 1.27 | 1.09 | 1.67; 0.56 |
| Precipitated Zinc and Manganese Sulphates in water[d] (2 w/v % metals) | 0 | 0.08; 0 | 0.07 | 0.30; 0 | 0 | 0.14; 0 |

[a]Treatment effects were not significantly different aftr 29 days.
[b]10 Imp. gal. per acre applied with a low volume motorized knapsack sprayer early in the wet season when flower petals had already fallen
[c]Trees spaced 18 feet apart with square planting. Each trial plot consisted of 4 trees.
[d]Precipitated metal sulphates in water by addition of sodium carbonate ($ZnSO_4$, 59.90 g; $MnSO_3$, $4H_2O$, 55.30 g; $Na_2CO_3$, 47.67 g; water 13.6 l.) and applied at 100 Imp. gal. per acre.
[e]Score: 0 = none, 1 = slight, 2 = moderate, 3 = severe.

TABLE X

Foliar Micronutrient Spray Trial: Mean Treatment Effect on the Incident of Mottle-Leaf Symptons Observed on Trees 23 Weeks After Spraying

| Treatment[a] | Mottle-leaf Incidence Mean Score* |
|---|---|
| Control | 1.4 |
| Carrier Oil alone | 1.4 |
| Overbased Zn naphthenate | 0 |
| Overbased Mn naphthenate | 0.8 |
| Overbased Zn and Mn naphthenates | 0 |
| Precipitated Zn and Mn sulphates in water | 0 |

Score: : 0 = none, 1 = slight, 2 = moderate, 3 = severe
[a]See Table IX for identification and details of treatment All spray solutions, including that of the relatively low metal concentration (0.2% w/w metal) of the zinc and manganese overbased naphthenate mixture in carrier oil, resulted in significant increases in the leaf zinc content from a low range to one of adequacy. The leaf zinc naphthenate and the mixed elements, respectively, were applied per unit area in the case of the oil solutions than in the aqueous one. The oil solutions could therefore be regarded as being more efficient than the aqueous metal salt solution in relieving lead deficiency symptoms and increasing the tissue metal concentration of the deficient element.

TABLE XI

MEAN TREATMENT EFFECT ON THE ZINC AND MANGANESE CONTENTS OF VALENCIA ORANGE LEAVES SAMPLES AT 3 MONTHS AND 11 MONTHS RESPECTIVELY AFTER THE INITIAL FOLIAR SPRAYING

| | Leaf Metal Content (ppm)[b] | | | |
|---|---|---|---|---|
| | Zinc at | | Manganese at | |
| Treatments[a] | 3 months | 11 months | 3 months | 11 months |
| Control | 29.9 | 27.7 | 272.5 | 406.9 |
| Carrier Oil alone | 27.1 | 25.2 | 163.8 | 342.5 |
| Overbased Zn naphthenate | 71.5 | 34.3 | 247.8 | 438.6 |
| Overbased Mn naphthenate | 28.9 | 26.0 | 236.6 | 328.1 |
| Overbased Zn and Mn naphthenates | 48.5 | 29.3 | 210.3 | 372.0 |
| Precipitated Zn and Mn sulphates in water | 66.3 | 33.1 | 240.0 | 343.4 |
| S. E. ± | 3.2 | 1.5 | 34.1 | 75.4 |
| C. V. % | 20.0 | 14.8 | 42.1 | 57.4 |

[a]See Table IX for identification and details of treatment.
[b]In the leaf samples taken before the spray treatments were applied the mean leaf zinc content was low (24 ppm) with some of the plot trees being in the deficiency range, while the mean leaf manganese concentration (359 ppm) was in the excessive range.

The fruit quality components assessed in the main crop included the fruit size, the juice and acid content, total soluble solids of the juice and the total soluble solids/acid ratio. The treatment effects on fruit size, as indicated by the number of oranges per box, were highly significant. Trees sprayed with the oil solutions of the overbased metal naphthenates and carrier oil neat produced significantly larger fruits than did the untreated (Table XII). Though the tendency was for the aqueous precipitated metal sulphate spray to increase the size of the orange, such increases were not significant when compared with the fruit size of the untreated trees. The inclusion of the overbased metal naphthenates in the oil seemed not to have adversely affected fruit size, and in fact, trees sprayed with the oil solution of the overbased zinc and manganese naphthenates yielded significantly larger fruits than those sprayed with the aqueous precipitated metal sulphates.

TABLE XII

FOLIAR MICRONUTRIENT SPRAY OIL: MEAN TREATMENT EFFECTS ON FRUIT SIZE AND QUALITY COMPONENTS OF VALENCIA ORANGE

| Treatments[a] | Fruits Per Box | Juice Content (% w/w) | Total Soluble Solids (% w/w) | Acid (Citric) Content (% w/w) | Total Soluble Solid/acid Ratio |
|---|---|---|---|---|---|
| Control | 248 | 44.9 | 10.7 | 0.94 | 11.4 |
| Carrier Oil alone | 201 | 46.0 | 10.5 | 0.92 | 11.6 |
| Overbased Zn naphthenate | 214 | 44.7 | 10.7 | 0.90 | 12.0 |
| Overbased Mn naphthenate | 204 | 44.5 | 10.5 | 0.87 | 12.0 |
| Overbased Zn and Mn naphthenates | 190 | 46.2 | 10.0 | 0.92 | 10.9 |
| Precipitated Zn and Mn sulphates in water | 227 | 44.6 | 11.1 | 0.95 | 11.7 |
| S. E. ± | 10.0 | 0.71 | 0.17 | 0.087 | 0.37 |
| C. V. % | 13.7 | 4.4 | 4.7 | 27.0 | 9.2 |

[a]See Table IX for identification and details of treatment

What is claimed is:

1. An overbased composition of matter in micelle form having the empirical formula:

$$(RCOO)_2M \cdot xM(OH)_2 \cdot yMO$$

where M is zinc, copper, iron, manganese or molybdenum; R is a cycloalkyl radical having from 10 to 43 carbon atoms and $(x+y)$ is a number representing the overbasicity ranging from $>0$ to 19, $x$ being the number of metal naphthenates molecules in the outer layer of said layer, said hydroxide and oxide represented by $M(OH)_2$ and $MO$, respectively, constituting the excess base in said composition wherein the neutral salt $(RCOO)_2M$ forms an absorbed layer on the hydroxide/oxide moiety represented by $M(OH)_2$ and $MO$, whereby the possibility of free naphthenic acids being present in said composition is eliminated.

2. A foliar feeding oil spray composition for supplying trace metals to plants comprising at least one overbased trace metal salt of naphthenic acids as defined in claim 1 and a non-phytotoxic hydrocarbon mineral oil carrier having a minimum gravity API of 27; a viscosity at 100° F. of between 55 and 100 Saybolt Universal Seconds; a boiling point range between about 85° and 775° F. and a minimum unsulphonated residue of 85%; said metal naphthenates being present in said oil at a concentration of between about 0.025 to 8.0 percent weight/volume.

3. The composition of claim 2, wherein said oil carrier has a boiling point range of about 600° to 775° F.

4. The process for supplying essential trace elements to plants comprising spraying the leaves, branches or barks of said plants with from about 0.5 to about 20 gallons per acre of the composition of claim 2.

5. A process for preparing a micronutrient composition containing an overbased oil soluble naphthenate of a metal selected from the group of molybdenum, copper, zinc, manganese and iron comprising mixing a solution of naphthenic acids having a molecular weight ranging from about 200 to about 620 in a light aromatic solvent of low viscosity having a boiling point ranging up to about 300° F. with alcoholic solutions of alkali hydroxide and of the inorganic salt of the selected metal, water being added and/or the hydrated inorganic salt being used in the case of manganese; the ratio of equivalents of metal to naphthenic acid being from about 1 to about 20; distilling off the solutions including some of the aromatic solvent, mixing with the remainder a horticultural spray oil comprising a non-phytotoxic hydrocarbon mineral oil having a minimum API gravity of 27; a viscosity at 100° F. of between 55 and 100 SUS; and a boiling point range between about 85° and 775° F., removing substantially all of said aromatic hydrocarbon solvent from the resulting mixture by vacuum distillation up to a liquid temperature of not greater than 130° C., and giving the residual spray oil a final polishing by removing any fine particles by centrifugation.

6. A process as in claim 5 in which methanolic solutions of sodium hydroxide and of the halide of the selected metal are used.

7. The process of claim 5 wherein said oil has a boiling point range of between about 600° and 775° F.

8. Micronutrient spray oil soluble naphthenate compositions containing a composition of matter in micelle form having the empirical formula:

$$(RCOO)_2M \cdot xM(OH)_2 \cdot yMO$$

where M is zinc, copper, iron, manganese or molybdenum; R is a cycloalkyl radical having from 10 to 43 carbon atoms and $(x+y)$ is a number ranging from $>0$ to 10, wherein the neutral salt $(RCOO)_2M$ forms an absorbed layer on the hydroxide/oxide moiety whereby the possibility of free naphthenic acids being present is eliminated and prepared by the process comprising mixing a solution of naphthenic acids having a molecular weight ranging from about 200 to about 620 in a light aromatic solvent of low viscosity having a boiling point ranging up to about 300° F. with alcoholic solutions of alkali hydroxide and of the inorganic salt of the selected metal, water being added and/or the hydrated inorganic salt being used in the case of manganese; the ratio of equivalents of metal to naphthenic acid being from about 1 to about 20; distilling off the solutions including some of the aromatic solvent, mixing with the remainder a horticultural spray oil comprising a non-phytotoxic hydrocarbon mineral oil having a minimum API gravity of 27; a viscosity at 100° F. of between 55 and 100 SUS; and a boiling point range between about 85° and 775° F., removing substantially all of said aromatic hydrocarbon solvent from the resulting mixture by vacuum distillation up to a liquid temperature of not greater than 130° C., and giving the residual spray oil a final polishing by removing any fine particles by centrifugation.

9. The composition of claim 8, in which methanolic solutions of sodium hydroxide and of the halide of the selected metal are used.

10. The composition of claim 8, wherein said oil has a boiling point range of between about 600° and 775° F.

* * * * *